(12) United States Patent
Deklerow et al.

(10) Patent No.: US 6,581,858 B1
(45) Date of Patent: Jun. 24, 2003

(54) METHOD AND APPARATUS FOR CRUSHING FLUORESCENT LAMPS AND SEPARATING COMPONENTS THEREOF

(75) Inventors: Joseph W. Deklerow, Rochester, NY (US); Otto Muller-Girard, Rochester, NY (US)

(73) Assignee: Dextrite, Inc., Rochester, NY (US)

( * ) Notice: Subject to any disclaimer, the term of this patent is extended or adjusted under 35 U.S.C. 154(b) by 38 days.

(21) Appl. No.: 09/654,961

(22) Filed: Sep. 5, 2000

(51) Int. Cl.$^7$ ............................................... B02C 19/12
(52) U.S. Cl. .................. 241/19; 241/24.14; 241/24.15; 241/79; 241/79.1; 241/99
(58) Field of Search ........................ 241/24.14, 24.15, 241/24.22, 24.3, 19, 60, 99, 79, 79.1, 55, 56

(56) References Cited

U.S. PATENT DOCUMENTS

| | | | | |
|---|---|---|---|---|
| 2,628,036 A | * | 2/1953 | Hall | 241/185.5 |
| 3,004,721 A | * | 10/1961 | Notzold | 241/14 |
| 5,092,527 A | * | 3/1992 | Perry et al. | 241/19 |
| 5,586,730 A | * | 12/1996 | Mortrud | 241/100 |
| 5,884,854 A | * | 3/1999 | M.ang.nsson et al. | 241/19 |
| 6,059,206 A | * | 5/2000 | Potts | 241/24.12 |

* cited by examiner

Primary Examiner—Mark Rosenbaum
(74) Attorney, Agent, or Firm—Shlesinger, Fitzsimmons & Shlesinger

(57) ABSTRACT

Components of crushed fluorescent lamps are conveyed pneumatically from a lamp crusher housing to a cyclonic hopper and enter tangentially into the hopper adjacent its upper end. The components include heavy glass particles and caps which are allowed to drop by gravity into a separator housing where they are separated from each other and discharged into different storage containers. Lighter glass particles and dust are recirculated from the upper end of the hopper back to the crusher housing. A vacuum source draws dust and vapors pneumatically from the bottom of the hopper and introduces them tangentially into a cyclone filter housing where particulate matter is allowed to drop into a dust collector. This vacuum source also draws lighter dust and vapors from the upper end of the cyclone filter housing to a dust and mercury filter. Mounted in the crusher housing is a paddle element which rotates adjacent lamp crusher blades and mechanically sweeps lamp components towards the crusher housing outlet.

22 Claims, 4 Drawing Sheets

METHOD AND APPARATUS FOR CRUSHING FLUORESCENT LAMPS AND SEPARATING COMPONENTS THEREOF

BACKGROUND OF THE INVENTION

This invention relates to fluorescent lamp crushing apparatus, and more particularly to an improved method and associated apparatus for simultaneously separating and delivering to separate containers components of crushed fluorescent lamps and the like, such as end caps, fluorescent powder and glass.

Fluorescent lamps in tubular form are the dominant indoor light source for offices, shops, laboratories and industrial plants. While they are produced and employed in linear, circular and U-shaped configurations, the mainstay of tubular fluorescent lamps appear to be four foot and eight foot long linear fluorescent tubes, which have diameters of 1.5 inches (38 m.m.). Lamps of the type described have a lifetime Of about 8,000 to 10,000 operating hours. Typically they last from one to three years depending upon the use cycle. In some shops and offices replacement of failed lamps is performed on a demand basis—i.e., when the ends of the lamps turn black and reduced output is noted. In many other situations, and particularly in large office complexes and manufacturing plants, fluorescent lamp replacement for a whole floor or area is performed on a scheduled basis, when the affected lamps are known to have been in service for a specific period of time. In each situation, a rather significant spatial volume of spent fluorescent lamps quickly accumulates and requires disposal.

One solution for disposing large volumes of such lamps is to employ machines which safely crush the lamps into near powder form. Several such lamp crushers are disclosed, for example, in U.S. Pat. Nos. 4,655,404, 5,205,497 and 5,575,429, each of which patents is owned by the assignee of the present application. As disclosed in those patents, the discharge ends of the respective crusher machines usually communicate with 55 gallon drums which receive the crushed components, while mercury vapors and the like that are discharged upon the crushing of the lamps are being accumulated in associated filter mechanisms. Lamps of the type described contain mercury, portions of which when the lamps are crushed, are retained by the above-noted filter mechanisms, but residual mercury in the crushed lamps can constitute a health hazard when present in significant quantities. For that reason it is customary for the above-noted drums containing the crushed lamps carefully to be sealed for shipment and storage, thereby promoting sound environmental handling of the lamp crushing.

Disposal of crushed fluorescent lamps in the manner noted above still represents a long term environmental hazard, since the drums containing lamp waste eventually will rust through, resulting in leakage of their contents to the environment. While this consequent leakage may take some time to occur, recycling of the ingredients of crushed fluorescent lamps is viewed by many environment jurisdictions to be the better and eventually only practical solution. In accordance with the invention disclosed herein, the first step in such recycling process is the mechanical separation of the main ingredients of the lamps—namely, the glass, end caps and the fluorescent powder (halo-phosphate) components. In addition, each such fluorescent tube normally contains a small quantity of metallic mercury, e.g. in the vicinity of 25 to 50 milligrams, which attaches to most components of the lamps, but mainly spreads throughout the fluorescent powder. While U.S. Pat. No. 5,092,527 and 5,492,278 have disclosed apparatus for crushing fluorescent lamps and separating the components thereof, such prior art equipment has proved to be unsatisfactory in connection not only with the efficiency of the crushing of layers and the separation of components, but also in connection with the rate at which lamps can be crushed and separated.

Accordingly, it is an object of this invention to provide a novel method of separating the constituant components of the crushed fluorescent tubes into end caps, fluorescent powder and glass, near or adjacent to their points of origin in the lamp crushing cycle, thereby to maximize the ability to compact and thus ease subsequent handling of the components. In this way each of the various components may be treated or otherwise handled or disposed of by machinery which forms no part of this invention, and which may be capable of recovering the mercury and purifying the residues so that the latter may serve as the raw materials for new fluorescent lamps.

Still another object of this invention is to provide improved lamp crushing apparatus having associated therewith a novel separating mechanism which separates and delivers various components of the crushed lamps to separate containers for use as raw materials in the production of new lamps.

Other objects of the invention will be apparent hereinafter from the recital of the appended claims when read in conjunction with the accompanying drawings.

SUMMARY OF THE INVENTION

To convey the components of crushed fluorescent lamps from lamp crusher housing to a cyclonic hopper, a duct is connected at one end to an outlet of the crusher housing and at its opposite end the hopper adjacent its upper end. A large blower has an outlet connected to the duct to blow air through the duct in the direction away from the crusher housing and toward the hopper thereby generating a vacuum at the crusher housing outlet and pneumatically conveying the lamp components tangentially into the hopper, where the heavier glass particles and caps are allowed to drop by gravity into a separator housing where they are separated from each other and discharged into different storage containers. The upper end Of the hopper is connected to the inlet of the fan so that lighter glass particles and dust are recirculated back to the crusher housing. Another vacuum source draws dust and vapors pneumatically from adjacent the bottom of the hopper and tangentially into a cyclone filter housing where particulate matter is allowed to drop into a dust collector, and draws lighter dust and vapors from the upper end of the cyclone filter housing to a dust and mercury filter. In addition to rotating crusher blades the crusher housing contains a paddle element which rotates with the blades and mechanically sweeps lamp components towards the crusher housing outlet.

THE DRAWINGS

DETAILED DESCRIPTION OF THE PREFERRED EMBODIMENTS

Figure 1:
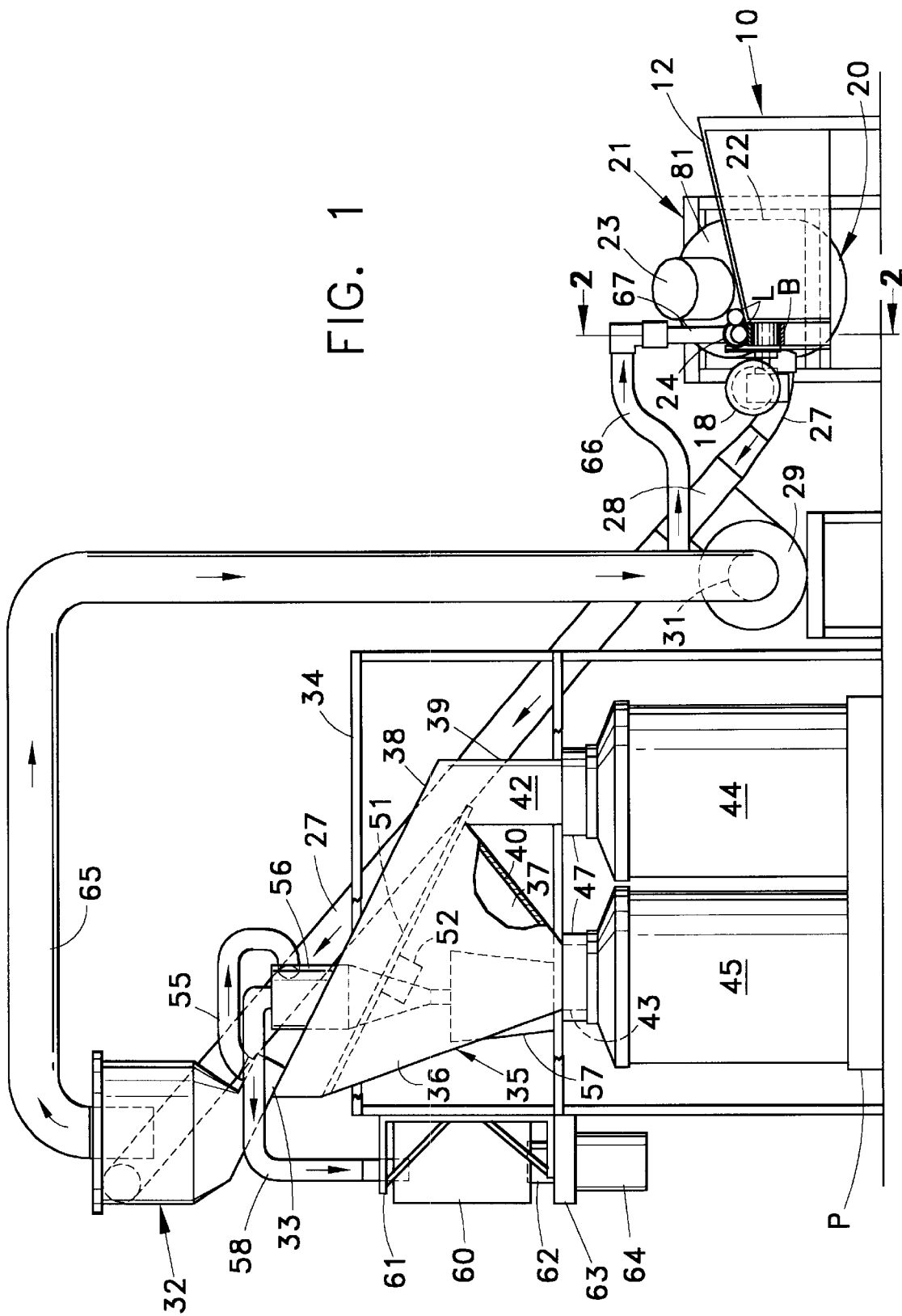
FIG. 1 is a front elevational view of lamp crushing and separating apparatus made according to one embodiment of this invention with arrows being employed to illustrate the direction of travel of air circulating through the apparatus.

Referring now to the drawings by numerals of reference, 10 denotes generally a frame having thereon a plane, lamp supporting surface 12 inclined slightly to the horizontal, and registering at its lower edge with one side of the upper run 13 of an endless conveyor belt B. Belt B is mounted to travel about a pair of spaced drive wheels on sprockets 14 and 15, which are mounted on frame 10 for rotation about a pair of spaced, parallel, horizontal axes, and with the upper run 13 of the belt being spaced beneath a narrow ledge or flange 15 which projects from one side of frame 10. In the embodiment illustrated, a conventional gear mechanism 17 connects the shaft of the forward wheel 14 to the output of an electric motor 18 to be driven thereby in a direction to cause the upper run 13 of the belt to travel toward the right in FIG. 2, and toward a fluorescent lamp crusher denoted generally by the numeral 20.

Crusher 20 comprises a cylindrical crusher housing 22 supported on a frame 21 with its upper inlet end inclined slightly to the vertical. As noted in greater detail hereafter, housing 22 contains a separator paddle and lamp crusher elements which are rotated by a ½ HP drive motor 23 that is mounted on the closed, upper end of the housing, and which is shown in phantom by broken lines in FIG. 2. Fluorescent lamps L are adapted to be delivered one by one into the path of the crushing elements by a tubular feed pipe 24, which is sealing secured at one end in and projecting from an inlet opening in housing 22, and has an open outer end positioned to face incoming lamps delivered by belt B. Pivotally mounted in pipe 24 is a spring-loaded entry door 25 which is momentarily opened by each incoming lamp as described in greater detail; hereinafter.

Upon being crushed, the components of the crushed lamps fall downardly in housing 22 to an opening 26 (FIG. 6) in the bottom thereof which communicates with the lower, inlet end of an elongate suction pipe or conduit 27. Intermediate its ends conduit 27 communicates as at 28 with the discharge end of a blower 29, which is driven by a ¾ HP electric motor 31. The blower 29 forces air into the conduit 27 in a direction away from the crusher 20, and upwardly in FIG. 1 at the rate of approximately 594 CFM (cubic feet per minute) and tangentially into the upper end of a cylindrically shaped cyclonic hopper, which is denoted generally in FIGS. 1 to 3 by the numeral 32. Hopper 32, is supported on the upper end of a separator chamber housing 35 which is secured in a frame 34 beneath hopper 32. Hopper 32 has its lower, discharge end connected by a chute 33 (FIG. 1) with the upper end of the chamber in housing 35.

The blower 29 generates so much airflow upwardly in the conduit 27, that it creates a very strong vacuum in the bottom of the crusher housing 22, and in so doing, causes the components of the crushed lamps (crushed glass, end caps and fluorescent powders) to be withdrawn out through opening 26 of the housing 22, and to be conveyed upwardly to the hopper 32 for delivery to the separator chamber housing 35. The same vacuum, of course, also creates within the crusher housing 22 a constant vacuum which causes the crushed components of lamps to drop downwardly in the housing 22 for delivery to the separator chamber in housing 35.

Housing 35, which is generally triangular in cross-section, comprises a pair of spaced, parallel sidewalls 36 and 37, an inclined top wall 38, a vertical endwall 39, and a bottom wall 40 inclined at an acute angle to the upper wall 38. At opposite ends of its bottom wall 40 the housing 35 has formed therein two spaced, parallel, vertically extending outlet chutes 42 and 43, respectively, which communicate with the upper ends of waste collecting drums 44 and 45, respectively, that are supported on pallets P. As taught by the above-noted U.S. Pat. No. 5,205,497, the upper ends of the containers 44 and 45 are releasably connected to the lower ends of the associated chutes 42 and 43, respectively, by elongate, plastic sleeves 47 to prevent any accidental escape of toxic materials discharged from housing 22.

The components that are conveyed upwardly through chute 27 are discharged from housing 32 into the upper end of the housing 35, whereby the solid particles therein (end caps and crushed glass) fall onto the upper surface of an elongate separation screen 51 (FIGS. 1 and 3), which is secured to and extends between the sidewalls 36 and 37 of housing 35 in spaced, parallel relation to the top wall 38 of the housing. Screen 51, which is engaged at its underside by a viberator 52, functions to separate the ground glass chips from the end caps, by enabling the ground glass to pass downwardly through the screen 51 and onto the bottom wall 40 of the housing 35, from whence the chips gradually slide downwardly into the chute 43 and hence into the container 45. The larger crushings or lamp components which are conveyed into the upper end of housing 35, such as the end caps, which are comprised mainly of aluminum, some plastic insulation, connecting wires and filaments, slide down the screen 51 and drop through the chute 42 into the container 44.

To remove any dust or vapors contained in the crushings or waste components that enter the housing 32, the upper wall of its discharge chute 33 has therein a dust and vapor outlet that is connected to one end of a dust conveying duct 55. Duct 55 extends upwardly over the top of housing 35 and downwardly at its opposite end into an opening formed in the periphery of a cylindrically shaped dust cyclone filter housing 56 adjacent the upper end thereof, so that dust and vapors enter tangentially into housing 56. Housing 56 communicates at its lower end with a dust collector pail 57 into which dust and particulate matter drop by gravity after entering housing 56. Secured at one end coaxially in the cylindrically shaped upper end of housing 56 is a duct 58, the opposite end of which is releasably and sealingly secured in an opening in the upper end of a filter housing 60 to communicate with its filter. Housing 60, which contains a dust and mercury filter, is secured by a bracket 61 to one side of frame 34, and is connected at its lower end to the inlet 62 of a suction fan or blower 63, which generates a vacuum in the filter housing 60 and duct 58. Blower 63 is driven by ⅓ HP motor 64, and has an exhaust side which opens on and exhausts to the atmosphere. The tangential entry of dust and air into housing 56, and the central upward exit of air from the housing by duct 58 promotes dust separation in housing 56 by centrifugal and gravity action.

In practice, blower 63 draws dust and mercury laden air from the lower end of housing 32 and through the filter housing 60 at the rate of approximately 239 CFM. At the same time, a substantially larger quantity of air, on the order of 330 CFM, is recirculated from the top of housing 32 back to the inlet of the blower 29 by a larger duct 65, which is secured at one end in the upper end of housing 32, and at its opposite end in the inlet to blower 29. Adjacent the inlet of blower 29 duct 65 is connected by a smaller duct 66 to the upper end of a still smaller pipe or duct 67 the lower end of which is connected to a circular opening 68 (FIG. 2) formed in the inner end of the feed pipe 24 to communicate with the interior of crusher housing 22 by the same opening through which lamps L enter such housing. Notably, the inlet to the recirculating duct 65 has been placed such that the air entering that duct from housing 32 enters at a right angle compared to the travel of air entering from conduit 27 into the housing 32, thus minimizing the entrapment of any chips or other particles in the air that is recirculated through the ducts 65, 66 and 67 to the crusher housing.

Figure 2:
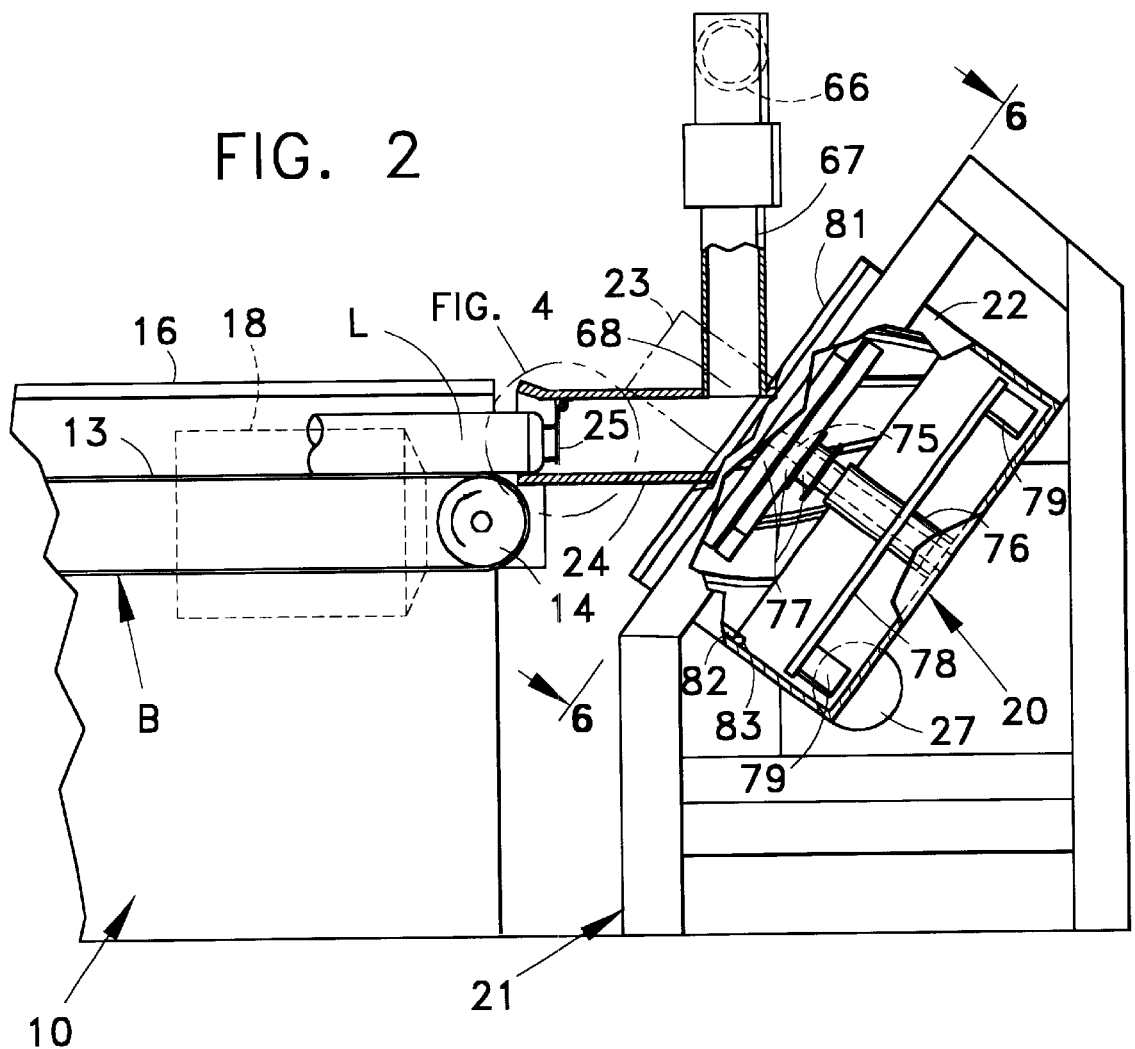
FIG. 2 is a slightly enlarged fragmentary sectional view of this apparatus taken along the line 2—2 in FIG. 1 looking in the direction of the arrows, and with portions thereof being shown in full.
Figure 5:
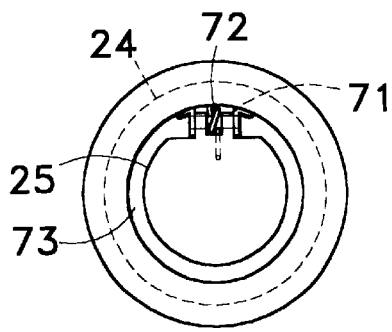
FIG. 5 is an end view looking at the left end of the lamp feed pipe as shown in FIG. 4 but with the lamp removed to show the associated entry door in its closed position.
Figure 4:
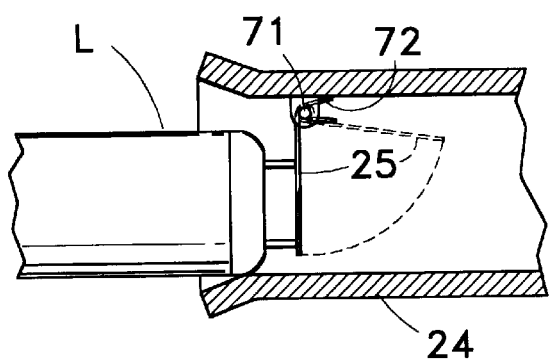
FIG. 4 is an enlarged fragmentary view of the portion of the lamp feed pipe enclosed in the circle shown by broken lines in FIG. 2.
Figure 3:
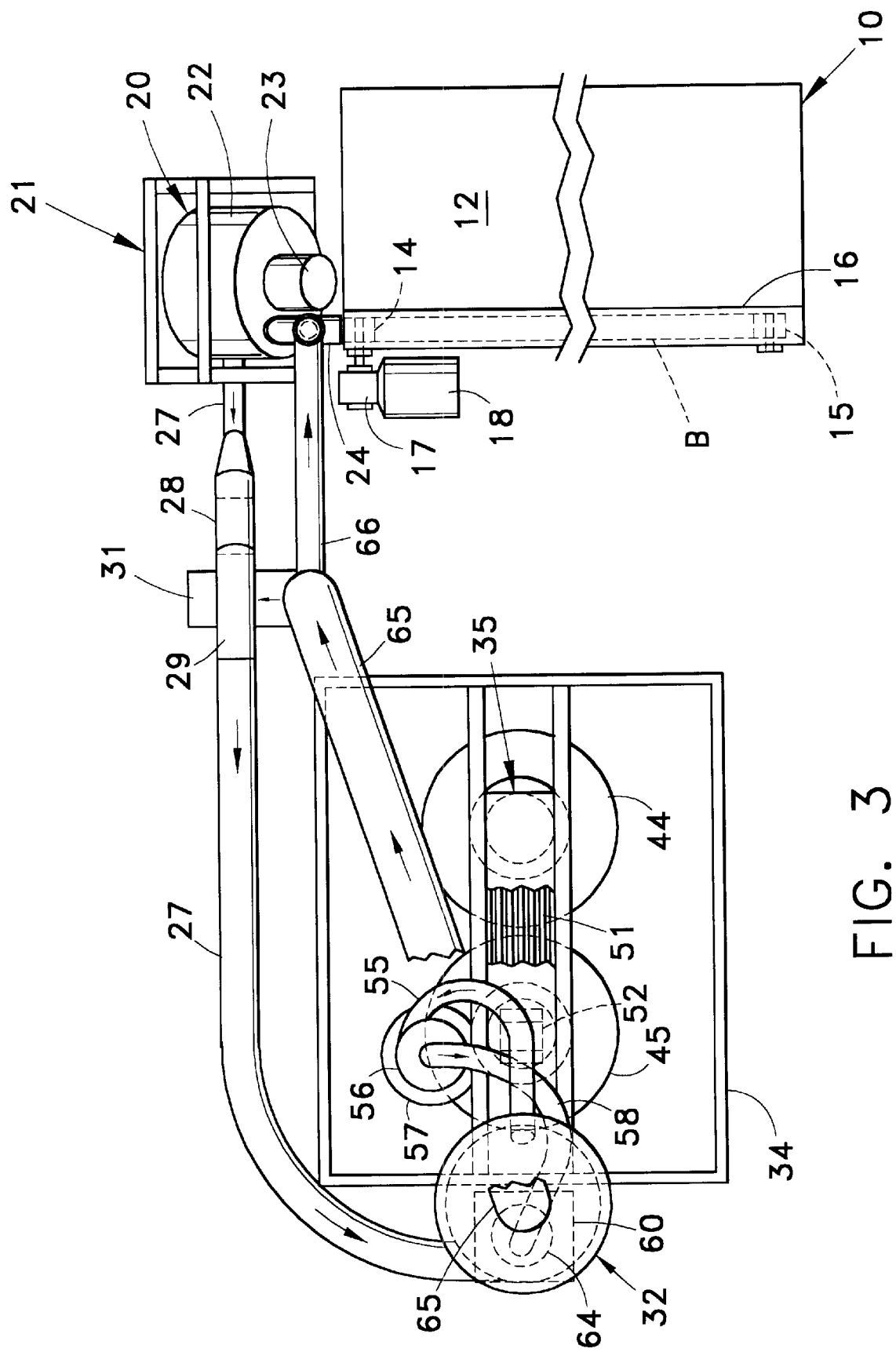
FIG. 3 is a fragmentary plan view of this apparatus.

Referring now to FIGS. 2, 4 and 5, it will be noted that the spring-loaded door 25 in feed pipe 24, while generally circular in configuration, is smaller in diameter than the internal diameter of pipe 24. The door 25 which is pivotally mounted in pipe 24 by a pin 71 and associated spring 72, normally is urged by the spring into a closed position in which it extends transversely of the bore in pipe 24. In this position, as shown in FIG. 5, its peripheral surface is slightly spaced radially from the inner peripheral surface of pipe 24, thus leaving a nearly annular space 73 for permitting air travel at all times through pipe 24 into housing 22. As noted hereinafter, lamps L entering the feed tube 24 engage and urge door 25 to its open position (broken lines in FIG. 4) as the lamps are fed into housing 22.

In use, a supply of fluorescent lamps L that are to be crushed, are placed upon the inclined surface 12 of the frame 10, with the lowermost lamp or lamps rolling onto the upper surface of the upper run 13 of the conveyor belt B. The lamps may be anywhere from up to four feet to eight feet in length, and depending upon the overall length of the support surface 12 and the conveyor belt B, one or more lamps may move by gravity downwardly, and possibly one behind the other, onto the upper run 13 of the belt B. When the belt is operated, lamps L are fed successively into the flared open end Of the feed pipe 24 where they engage and open the normally closed door 25, and are inserted into the path of rotating crusher elements in housing 22. During this time also, of course, the blower 29 is operated so that air and broken lamp fragments are drawn upwardly through duct 27 and are introduced into the hopper 32. At this time also, of course, the air from the blower 29 is recirculated through the duct 65 to the inlet of the blower 29, and through duct 66, pipe 67 and the opening 68 in the feed pipe 24, so that air is constantly circulated through housing 22 and the hopper 32. Also at this time the vibrator 52 is operated, as is the motor 64 for the suction fan 63, which operates, as noted above, to draw dust and particulate matter into the cyclone filter housing 56 and to draw dust and mercury through duct 58 to the filter contained in the filter housing 60. During such operation of the apparatus, of course, ground glass chips, and the like, which enter housing 35 from the hopper 32, are allowed to pass downwardly through the screen 51 to container 45, while the lamp end caps, plastic insulation, connecting wires and the like, slide down the screen 51 and drop into the container 44.

A central purpose for the exhaust blower 62 is the maintenance of a slightly negative pressure within the machine and its attachments (drums 44, 45, pail 57, crusher 22, etc.) at all times, such that dust and Mercury vapors will not escape from the machine. The internal negative pressure forces outside air to leak into the machine at all less than perfectly sealed seams and through the annular space 73 (FIG. 5) at the point of tube entry. This leaked-in air will pick up dust and Mercury vapors on its way to the exhaust blower. The filter in housing 60, partially fiber for dust capture and partially activated charcoal, removes the dust and vapors to insure the exhausting of acceptable air.

Figure 6:
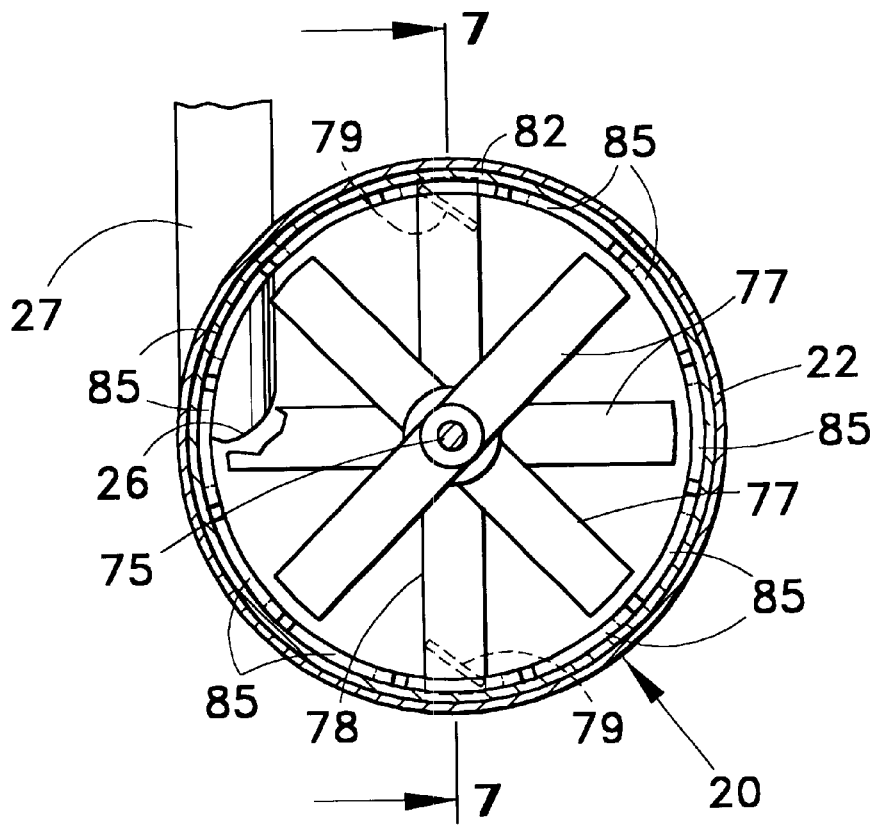
FIG. 6 is a sectional view taken along the line 6—6 in FIG. 2 looking in the direction of-the arrows.

To supplement the action of the blower 29, which draws air, vapors and broken lamp fragments from the crusher housing 22 into duct 27, housing 22 is provided with separator paddle mechanism which helps to discharge vapors and fragments into duct 27. As shown in FIGS. 2 and 6, the output of motor 23 is drivingly connected to one end of a crusher shaft 75, the opposite end of which is drivingly connected in housing 22 to one end of a paddle driving shaft 76, the opposite end of which is rotatably journaled in a bearing (not illustrated) in the closed end of housing 22. A plurality (three in the embodiment illustrated) of similarly shaped crusher blades 77 are secured medially of their ends to shaft 75 for rotation thereby coaxially in housing 22 adjacent its upper, open end through which lamps L enter the housing. Secured medially of its ends to shaft 76 for rotation thereby beneath blades 77 is an elongate metal plate 78 having secured to and projecting downwardly from opposite ends thereof a pair of rectangularly-shaped blades 79. When driven by motor 23, shafts 75 and 76 rotate the crusher blades 77 to crush lamps, and plate 78 and paddles 79 in the same direction to help sweep or urge crushed glass and vapors through opening 26 and into duct 27.

Figure 7:
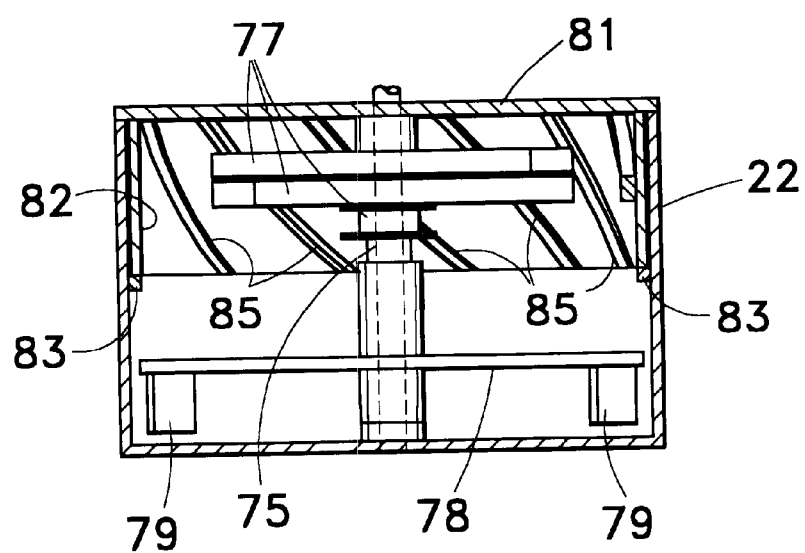
FIG. 7 is a sectional view taken along the line 7—7 in FIG. 6 looking in the direction of the arrows.

To protect housing 22 and to supplement the effect of the crusher blades 77, housing 22 has removably mounted coaxially in the upper end thereof beneath its cover 81, and in radially spaced relation to the outer ends of blades 77 an annular impact shield 82 made of relatively thick steel (e.g.$^{3}/_{16}$"). The circular lower edge of shield 82, which is axially spaced above the paddle plate 78, is releasably seated on a circular bracket 83 that is secured coaxially to and projects radially from the inner peripheral surface of housing 22 intermediate the ends thereof. To assist the blades 77 in the pulverizing of small glass chips and end caps, a plurality (twelve in the embodiment illustrated) of elongate, narrow, steel baffles 85 are secured to, as by welding, and project slightly from the inner peripheral surface of shield 82 in angularly spaced relation to each other, and in radially spaced relation to confronting ends of the crusher blades 77. And as shown more clearly in FIG. 7, the baffles 85, which may be made from ¼" square strips of desired length (e.g. 4"), are inclined at approximately 45° to the axis of housing 22 and shaft 75, so that any particles pulverized thereby during the crusher operation will be guided downwardly thereby into the path of the rotating paddles 79.

From the foregoing, it will be apparent that the present invention provides novel method and apparatus for considerably improving the crushing and separation Of the components of crushed fluorescent lamps tubes in rather large quantities, and also enables recovery of mercury and the purifying of residues that may otherwise serve as raw materials for new lamps. The efficiency of crusher 20 is considerably improved by use of the. removable shield 82 bearing the angularly spaced baffles 85, which cooperate with blades 77 to increase the pulverization of crushed lamp components, and also assit in directing such components into the path of the rotating paddles 79. In turn the paddles improve the efficiency with which crushed components are directed toward the crusher housing outlet 26 for conveyance to the cyclonic hopper 32.

While this invention has been illustrated and described in connection with only certain embodiments thereof, it will be apparent that it is capable of further modification, and that this application is intended to cover any such modifications as may fall within the scope of one skilled in the art, or the appended claims.

What is claimed is:

1. A method of crushing fluorescent lamps and separating the components thereof, comprising
   feeding fluorescent lamps successively through the inlet of a crusher housing to be shattered therein into components including glass particles, dust, vapors and end caps,
   applying a vacuum to an outlet of said housing to cause air to flow through the housing from said inlet to said outlet and to cause said components to be discharged from said housing through said outlet,
   mechanically sweeping said components in said crusher housing toward said outlet thereof,
   pneumatically conveying the discharged components from said crusher housing tangentially into a cyclonic hopper adjacent the upper end thereof,
   allowing glass particles and end caps to drop by gravity in said cyclonic hopper and through an opening in the bottom thereof into a separator housing, and
   separating end caps from glass particles in said separator housing and discharging the separated caps and particles into different storage containers.

2. A method as defined in claim 1, including pneumatically conveying lighter glass particles and dust from the upper end of said cyclonic hopper back to said crusher housing for recirculation back to said cyclonic hopper.

3. A method as described in claim 1, including
   pneumatically conveying dust and vapors from said opening in the bottom of said hopper tangentially into a dust cyclone filter housing, and
   allowing dust particulate matter to drop by gravity out of an opening in the bottom of said cyclone filter housing into a dust collector positioned therebeneath.

4. A method as defined in claim 3, including
   connecting the upper end of said cyclone filter housing through a dust and mercury filter to a vacuum source, and
   operating said vacuum source to cause dust and vapors to be drawn from the upper end of said cyclone filter housing and into said dust and mercury filter.

5. A method as defined in claim 1, including pneumatically conveying said discharged components to said cyclonic hopper in an air stream moving at a rate in excess of 550 CFM.

6. A method as defined in claim 3, including drawing said dust and vapors from said cyclonic filter housing to said dust and mercury filter at a rate in excess of 200 CFM.

7. Apparatus for crushing fluorescent lamps and separating the components thereof, comprising
   a crusher housing having an inlet for accommodating lamps that are to be crushed, an outlet for discharging components of crushed lamps, and crusher means rotatable between aid inlet and outlet to crush lamps entering said housing,
   paddle means rotatable in said crusher housing between said crusher means and said outlet and operative to sweep said components toward said outlet,
   a cyclonic hopper spaced from said crusher housing,
   means for pneumatically conveying said components of crushed lamps from said crusher housing outlet, and tangentially into said hopper adjacent the upper end thereof,
   a separator housing positioned beneath said hopper and having therein a chamber communicating at its upper end with an opening in the bottom of said hopper to receive the heavier of said components which drop-by gravity through said opening and into said chamber, and
   separator means in said chamber positioned in the path of said heavier components entering said chamber and operative to separate the larger of said components from the smaller thereof.

8. Apparatus as defined in claim 7, including
   a dust cyclone filter housing mounted adjacent said hopper,
   a duct connected at one end to said hopper adjacent said opening in the bottom thereof, and connected at its opposite end to said cyclone filter housing adjacent the upper end thereof, and
   means for pneumatically conveying dust and vapors through said duct from said hopper and tangentially into said cyclone filter housing.

9. Apparatus as defined in claim 8, including a removable container connected to an opening in the bottom of said filter housing to receive and retain dust particles that drop by gravity from within said filter housing to said container.

10. Apparatus as defined in claim 8, including a
    a source of vacuum,
    means connecting said vacuum source to the upper end of said cyclone filter housing to cause dust and vapors to be pneumatically conveyed toward said vacuum source, and
    a dust and mercury filter interposed between said vacuum source and the upper end of said cyclone filter housing and operative to filter said dust and vapors.

11. Apparatus as defined in claim 7, including means interposed between the upper end of said hopper and said crusher housing inlet and operative pneumatically to convey lighter glass particles and dust from said hopper to said crusher housing for recirculation back to said hopper.

12. Apparatus as defined in claim 7, including
    a lamp inlet pipe sealingly secured at one end in said inlet in said crusher housing and projecting at its opposite end externally of said crusher housing to receive and convey lamps thereto one-by-one, and
    a circular, normally-closed entry door pivotally mounted in said pipe intermediate the ends thereof and disposed to be momentarily pivoted to its open position by each incoming lamp,
    said door being slightly smaller in diameter than the internal diameter of said inlet pipe whereby said door never completely seals the bore in said pipe.

13. Apparatus as defined in claim 7, including
    a conveyor belt registering with said inlet to said crusher housing and operable to feed lamps one at a time to said crusher housing, and
    lamp supply means for feeding lamps one at a time to said conveyor.

14. Apparatus as defined in claim 13, wherein said lamp supply means comprises a planar lamp support mounted adjacent to said conveyor in a plane inclined to the horizontal with the lower edge thereof confronting upon one side of the conveyor and the upper edge thereof spaced above and diagonally away from the conveyor, whereby when fluorescent lamps are placed side-by-side on said support, and parallel to each other and said conveyor, the lowermost lamp on the support rolls onto the conveyor each time the conveyor feeds a lamp to the crusher housing.

15. Apparatus as defined in claim 7, wherein said means for pneumatically conveying crushed lamp components to said hopper comprises, a duct connected at one end thereof to said outlet of said crusher housing and at its opposite end to the interior of said hopper, and means connected to said duct intermediate the ends thereof and operative to create a vacuum at said outlet and to convey said components in a stream of air through said duct from said,outlet to said hopper.

16. Apparatus as defined in claim 15, wherein said means connected to said duct comprises a blower having an outlet connected to said duct to blow air therethrough in a direction away from said crusher housing outlet and toward said hopper, and a return air duct connected at one end to the upper end of said hopper and at its opposite end to the inlet of said blower.

17. Apparatus as defined in claim 16, including means connecting said return air duct intermediate its ends to said inlet to the crusher housing.

18. Apparatus as defined in claim 7, wherein said separator means comprises an inclined screen mounted in said chamber in the path of said heavier components entering the chamber, said screen being operative to permit said smaller components to drop therethrough into a first container beneath said separator housing, and operative to retain and direct said larger components into a second container beneath said separator housing.

19. In apparatus as defined in claim 7, wherein said crusher means comprises a plurality of crusher blades mounted intermediate their ends for rotation in said housing between said inlet and outlet, an annular impact shield is removably secured in said housing adjacent said inlet thereof to surround said crusher blades in radially spaced relation thereto, and a plurality of rigid baffles are secured to and project slightly from the inner peripheral surface of said shield in angularly spaced relation to each other and in radially spaced relation to said crusher blades.

20. In apparatus as defined in claim 19, wherein a paddle plate is mounted intermediate its ends in said housing for rotation coaxially with said crusher blades, and in a region between said blades and said outlet of the housing, and a pair of paddles are secured to and project from opposite ends, respectively, of said paddle plate for rotation thereby in confronting relation to the inner surface of said housing and said outlet thereof.

21. In apparatus as defined in claim 20, wherein said baffles are inclined at an angle to the axis of said shield and in use operate to direct crushed particles toward said paddles and said outlet of said housing.

22. In apparatus as defined in claim 21, wherein said baffles are curved slightly intermediate opposite ends thereof.

* * * * *